July 24, 1962 T. W. REESOR 3,046,329

STEREO SOUND SYSTEM FOR TV

Filed Nov. 3, 1959 2 Sheets-Sheet 1

INVENTOR.
THOMAS W. REESOR
BY
Alexander & Dowell

July 24, 1962 T. W. REESOR 3,046,329

STEREO SOUND SYSTEM FOR TV

Filed Nov. 3, 1959 2 Sheets-Sheet 2

INVENTOR.
THOMAS W. REESOR
BY
Alexander & Dowell

United States Patent Office 3,046,329

Patented July 24, 1962

3,046,329
STEREO SOUND SYSTEM FOR TV

Thomas W. Reesor, Box 305, La Center, Ky.

Filed Nov. 3, 1959, Ser. No. 850,729
16 Claims. (Cl. 178—5.6)

This invention relates to television broadcasting and receiving systems, and more particularly relates to improvements in presently existing systems whereby compatible stereophonic sound may be added to the system.

My system employs as its basis a multiplexing principle similar to that which is taught in U.S. Patent 2,851,532 to Crosby.

It is a principal object of this invention to provide a compatible stereophonic sound system. The word "compatible" as used herein means that a conventional monophonic television receiver can reproduce properly balanced monaural sound when tuned to a television station broadcasting stereophonic sound according to the present invention. Conversely, a television receiver constructed according to my invention to receive stereophonic sound, can reproduce satisfactorily balanced monaural sound when turned to a station broadcasting conventional monophonic programs.

It is another primary object of my invention to provide a system for broadcasting and receiving programs with stereophonic sound over existing assigned television channels by employing the same basic equipment as is presently used in broadcasting over such channels together with appropriate additional equipment, so that only minor changes in the presently existing equipment are required and substantially no changes are required in the existing frequency allocations.

Still a further major object of the invention is to provide a system wherein only small changes, and relatively inexpensive additions, are required in order to convert existing home receivers so that they can not only receive present monaural broadcasts, but so that they can also receive compatible stereophonic programs broadcast according to my invention, the additional equipment being added to the conventional television receivers as simple attachments, separately purchased and easily installed.

In general, according to my invention, two different audio messages are transmitted, one in the existing audio channel, the other in an auxiliary audio channel, and both channels being frequency modulated on the usual television sound carrier. Although this invention relates particularly to the stereophonic transmission of the sound portion of television porgrams, it is also to be understood that the two messages need not necessarily be stereophonically related. The two messages are transmitted in the two audio channels by adding the messages together and transmitting the resulting summation signal over the usual television frequency modulated sound channel in the usual manner; and then by subtracting the messages and transmitting the resulting difference signal on a sideband having its carrier suppressed, and said difference-frequency modulated sideband being also frequency modulated onto the existing television sound carrier along with the regularly sent summation signal, but within a different portion of the modulation bandwidth. The subtraction signal can be transmitted with a restricted bandwidth, and the subcarrier which formed said single sideband being located just outside of the normal audio range and thereabove.

At the receiver, the summation signal is demodulated in the usual manner, and then the difference-frequency sideband is demodulated by first reinserting a subcarrier of the required frequency and phase and then demodulating the sideband after such carrier reinsertion. By this means at the receiver, the summation signal is reproduced and the difference signal is also separately reproduced. Thereafter, the summation and difference signals are added so as to reproduce one of the original messages, and are also separately subtracted so as to reproduce the other original message.

One important novel feature of the present invention is that the subcarrier which is employed in forming and demodulating the single sideband signal comprises the horizontal scanning frequency used during reproducing of the video information in the television system or alternatively, comprises a harmonic of the horizontal scanning frequency, as will be hereinafter more fully explained.

During stereophonic broadcasting at the transmitter according to the present system, two stereophonically related signals, A and B, are added together in a summation circuit and at the same time subtracted in a subtraction circuit so as to form respective sum and difference signals, $A+B$ and $A-B$. The $A+B$ signal is then filtered so as to limit it to a range, for instance below 15,000 cycles per second, and the A—B signal is likewise filtered so as to limit it to a range, for example, 100–7500 c.p.s. Within a conventional television system, it is well known that there is a horizontal scanning frequency of about 15,750 c.p.s. generated in the transmitter and broadcast with the composite television signal to each remote receiver. In my system, this horizontal scanning frequency, or alternatively a harmonic thereof, is employed as a subcarrier on which to modulate the $A-B$ signal. The output of this modulating step is then filtered so as to eliminate the one sideband and the carrier, and the other sideband is then frequency modulated on the main sound carrier between the uppermost limits of the $A+B$ signal and the harmonic of the scanning frequency which is used as the aforementioned subcarrier.

It has been found desirable to employ the second harmonic of the scanning frequency at approximately 31,500 c.p.s. and, in this case, the $A+B$ signal will be frequency modulated on the main sound carrier between zero and 15,000 c.p.s., and the $A-B$ signal in the form of the lower single side band will be frequency modulated on the main television sound carrier between 24,000 and 31,500 c.p.s. It is thus apparent that better frequency response is possible in the second channel (the $A-B$ channel) since the subtraction signal can be limited to the restricted range of frequencies without seriously impairing the fidelity of the output.

At the receiver, the incoming sound channel carrying both the sumation and the difference signals will first be demodulated so that the signals can be separated into two channels, the first chanel comprising the ordinary audio channel of the receiver and carrying the $A+B$ signal, and the second channel comprising an auxiliary stereo channel and carrying the $A-B$ modulated sideband signal. In the example mentioned wherein the second harmonic of the horizontal scanning frequency is used to form the $A-B$ sideband, the receiver will be provided with a frequency doubler for obtaining from the horizontal scanning frequency the second harmonic of 31,500 c.p.s. which is the same sub-carrier used to create the side band. This second harmonic subcarrier is then applied together with the $A-B$ sideband to a conventional sideband detector, known per se, to demodulate the sideband and retrieve the original difference signal, $A-B$.

At this point the $A+B$ signal and the $A-B$ signal have both been retrieved, and it is only necessary then to separate them into stereo channels as follows. The first stereo channel will reproduce by means of an audio transducer the A signal, and this A signal is produced by adding together the $A+B$ signal and the $A-B$ signal so that the B components cancel out and leave only the A components corresponding substantially with the original stereo signal A applied to the transmitter. In order to obtain the other stereo sound channel, the $A+B$ signal and the $A-B$ signal are subtracted so as to eliminate the A component and leave only the B component which is then broadcast by another similar audio transducer to provide a B signal corresponding substantially with the B signal applied to the input to the transmitter in the second channel.

It is important to note that a conventional monophonic television receiver turned to a program broadcast stereophonically according to the above discussed transmitter system will receive in its audio channel the $A+B$ signal which when reproduced by a conventional audio transducer will provide a perfectly satisfactory signal to listen to. Conversely, if a television receiver, stereophonically equipped according to my invention, is tuned to receive a monophonic broadcast over a conventional television station, this receiver will reproduce the monaural sound in its first signal channel but will reproduce nothing in its sideband or second channel because no sideband is present. However, inasmuch as the signal from the first channel is fed to both transducers by way of the respective summation and difference circuits, both audio transducers will reproduce the monophonic sound in a perfectly satisfactory manner.

My system is therefore compatible with presently existing equipment and usable within present frequency allocation as will be more fully discussed hereinafter in specific examples.

Other advantages of my system over the television systems of which I have knowledge at the present time are that there will be less noise and tendency to cross talk between the stereophonic channels, as well as better frequency response in the second channel. Moreover, the volume in the regular sound channel should remain at a constant level whether or not the set is receiving monaural or binaural programs. Furthermore, it is unnecessary to provide switching for the purpose of cutting off the second channel, or the subcarrier thereto, during conventional monophonic broadcasting or reception, in view of the fact of that the subcarrier channel is always present both at the transmitter and at each receiver, and in view of the fact that during monophonic broadcasting no modulated sideband will appear in the second channel, and therefore it is unnecessary to disconnect the same. Furthermore, in view of the fact that the second channel carries the difference frequencies, it can reproduce higher frequencies for the same channel bandwidth than is possible in other types of multiplex systems. The presence of the horizontal scanning frequency at all times in both the transmitter and in each receiver makes it very easy for the multiplex sideband to be formed and/or demodulated since the frequency and the phase of the subcarrier which is derived from the horizontal scanning frequency is closely controlled. Domestic television receivers can be converted to receive stereophonic signals broadcast according to the present system by adding a relatively simple attachment which can be economically marketed and easily connected to television equipment.

Other objects and advantages of my system will become apparent during the following discussion of the drawings, wherein.

Figure 1:
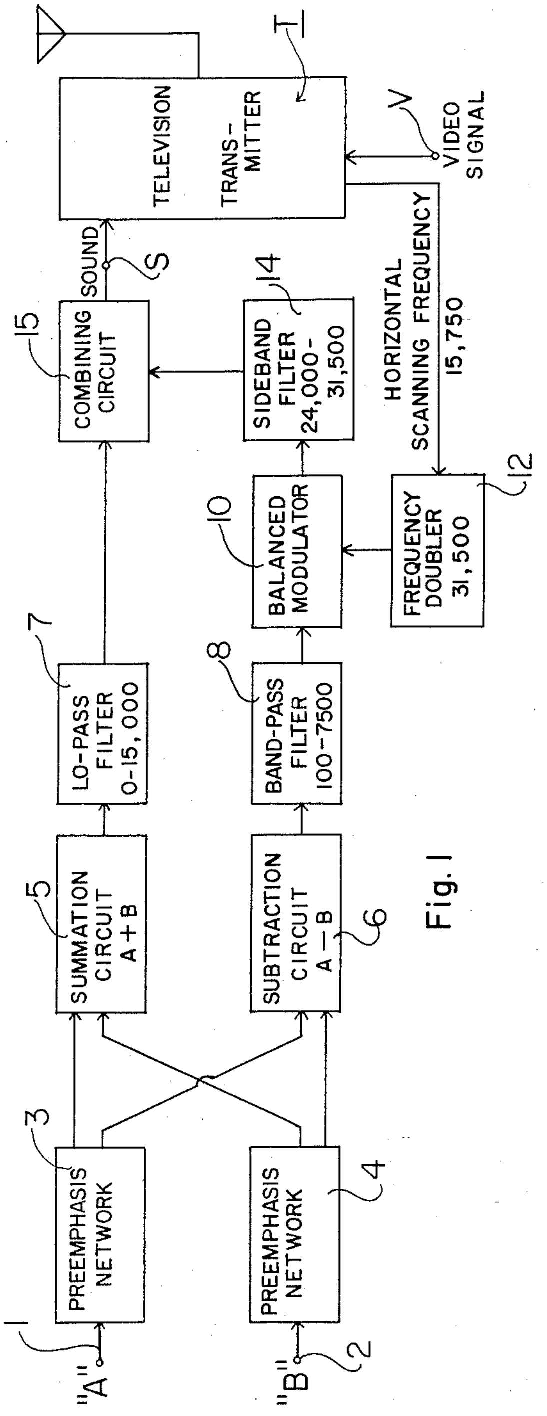
FIG. 1 shows a block diagram of the stereophonic transmission system according to the present invention.

Referring now to the diagram shown in FIG. 1, my system comprises an improvement over conventional television transmitting equipment which is represented per se by the box T. The transmitter T feeds an antenna in the conventional manner and has internal sweep circuits one of which generates the horizontal scanning frequency which is standardized at 15,750 c.p.s. The system also includes a video input terminal V and a sound input represented by the terminal S. At the left end of the block diagram of FIG. 1 are two inputs 1 and 2 representing respectively the first and second audio channels to which stereophonic inputs $A+B$ are applied. The input A passes through a preemphasis network 3 and the input B passes through a conventional preemphasis network 4. Each of the preemphasis networks has two outputs which respectively deliver identical signals. The outputs from the preemphasis network 3 are fed into a summation circuit 5 and to a subtraction circuit 6, and the outputs from the preemphasis network 4 are fed into the subtraction circuit 6 and the summation circuit 5, so that the output of the summation circuit 5 comprises an $A+B$ signal, and the output from the subtraction circuit 6 comprises an $A-B$ signal. The $A+B$ signal is then fed into a low-pass filter 7 which cuts off at around 15,000 cycles and thereby restricts the summation signal $A+B$ to the range of substantially 0–15,000 cycles. The 15,000 cycle figure is not per se critical, and is disclosed in the present system as a preferred frequency rather than as a precise limitation.

The output of the subtraction circuit 6 is fed through a band-pass filter 8 which eliminates frequencies outside of the range of 100–7,500 c.p.s. Here again, the frequency limits of this filter are to be viewed as those of a preferred embodiment. Frequencies below 100 c.p.s. can be eliminated since on a practical basis the lower frequencies have substantially no effect on the subjective sterophonic reaction and therefore are not needed in the second channel. Likewise, the upper frequency range in the second channel can be restricted for practical purposes in order to restrict the modulation components therefrom to the predetermined audio carrier bandwidth of the television system.

In the second channel, the B channel, a balanced modulator 10 is provided and the output of the band-pass filter 8 is fed to the balanced modulator wherein it is mixed with the output of a frequency doubler 12 which receives the horizontal scanning frequency generated within the conventional television transmitter T and selects the second harmonic thereof for application to the modulator 10. Within this balanced modulator the subcarrier frequency of 31,500 cycles is substantially balanced out and eliminated, and the output of the balanced modulator, comprising only sidebands, is fed to a sideband filter 14 which comprises a band-pass filter passing the frequency range of 24,000–31,500 c.p.s., and thereby selecting the lower sideband from the balanced modulator. This lower sideband output is then fed into a combining circuit 15 together with the output of the low-pass filter 7 and this range of signals from 0–31,500 c.p.s. is from there fed into the main television transmitter T through the terminal S and is modulated upon the main sound carrier of the television transmitter.

Figure 2:
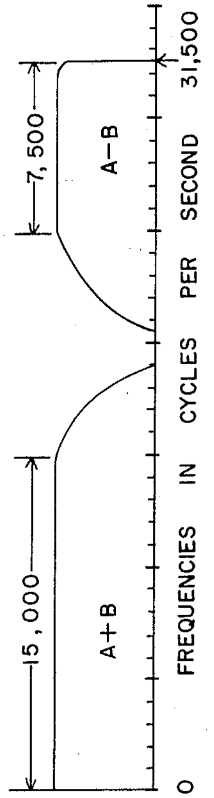
FIG. 2 is a diagram of the audio signals transmitted by the system of FIG. 1.

The modulation spectrum of the sound carrier from the transmitter T may be seen in the diagram of FIG. 2. At the left portion of the diagram is a range of audio frequencies representing the $A+B$ signal, 0–15,000 c.p.s. At the right of the diagram of FIG. 2 is illustrated the range of the lower sideband embodying the $A-B$ signal, and these two groups of signals are frequency modulated on the main television sound carrier of the transmitter T.

Figure 3:
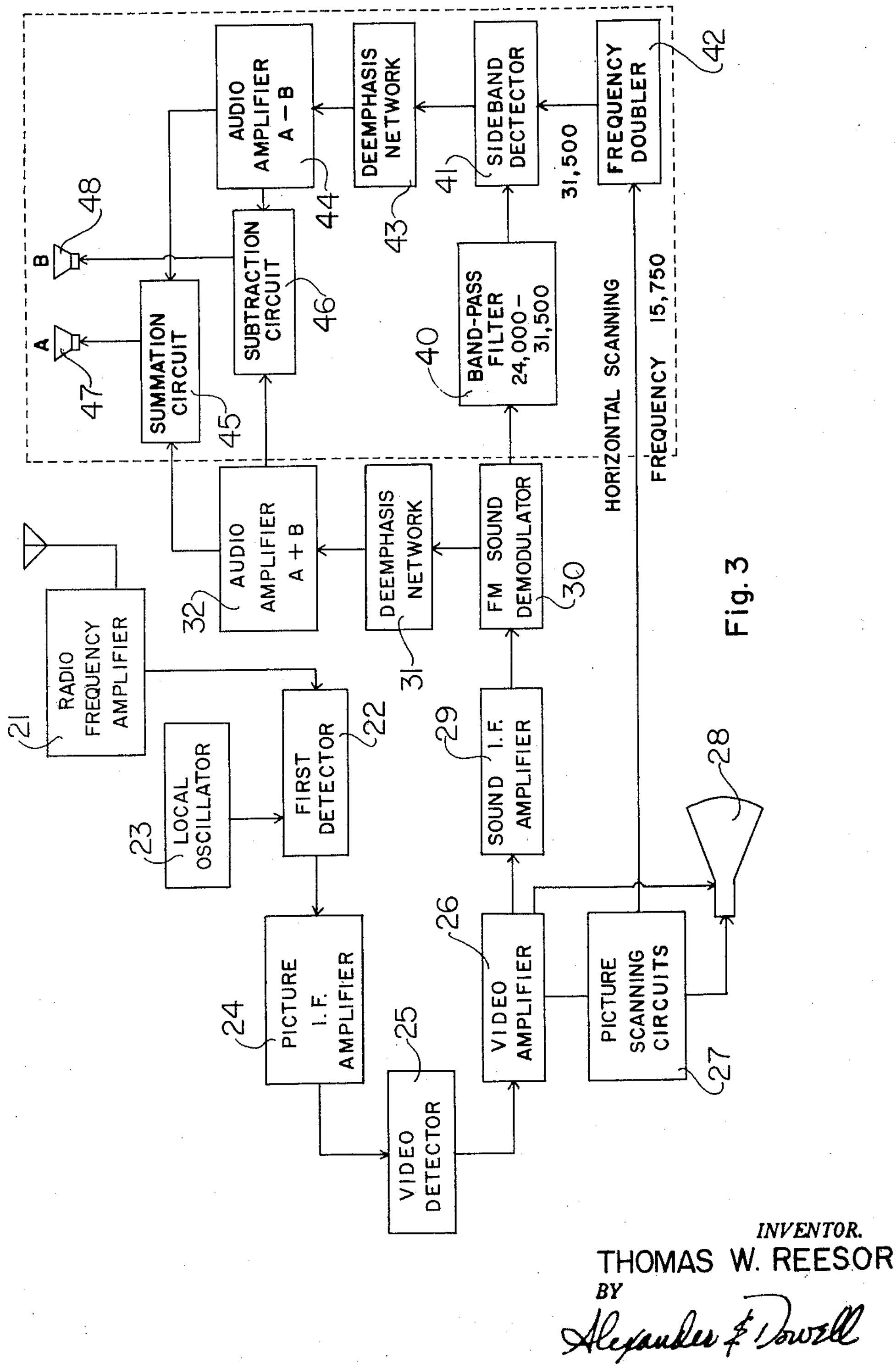
FIG. 3 shows a simplified block diagram of a television receiver, and further shows within a dashed-line box the additional units which are added to a conventional television receiver in order to convert it for stereophonic reproduction according to the present invention.

Referring now to FIG. 3, the left half of this figure represents a conventional domestic television receiver including a radio frequency amplifier 21 coupled with an antenna and delivering the amplified output of the signal received from the television transmitter T. This output is delivered to a first detector 22 wherein it is converted, by beating with the output of a local oscillator 23, into an intermediate frequency which is then fed to the picture I.F. amplifier 24, and thence to a conventional video detector 25. The output from the video detector is applied through a video amplifier 26 into a conventional picture scanning circuit 27 and thence to a cathode ray tube 28 for viewing. Also, the video amplifier 26 feeds a portion of its output to a sound I.F. amplifier 29 and thence to an F.M. sound demodulator 30, the output of which is represented by the diagram in FIG. 2 and comprises an audio signal $A+B$ within the range of 0–15,000 c.p.s., and the aforementioned $A-B$ sideband lying approximately within the range of 24,000–31,500 c.p.s.

The output from the F.M. sound demodulator is divided into first and second channels, and the first channel passes through the conventional audio circuits of the television receiver represented in FIG. 3 by the deemphasis network 31 and an audio amplifier 32 designed to pass the deemphasized $A+B$ signal. All of the circuits discussed so far with respect to FIG. 3 and including those designated by reference characters 21 through 32 inclusive are present in a conventional television receiver.

In order to provide a stereophonic reproduction of the signal broadcast by the transmission system shown in FIG. 1, certain additional circuits are required, and these circuits are enclosed within a dashed-line box comprising the right half of FIG. 3. As stated above, the F.M. sound demodulator also demodulates and delivers the sideband signal $A-B$, and this signal is then passed through another band-pass filter 40 which eliminates any spurious signals therefrom and delivers the $A-B$ sideband to a sideband detector 41 which may be of a conventional type employed in single sideband transmission systems. In order to detect the single sideband, it is necessary to reinsert the subcarrier employed to generate the sideband in the first place, and this carrier is obtained by means of the frequency doubler 42 the output of which is twice the horizontal scanning frequency or 31,500 c.p.s. The input to this frequency doubler 42 can be obtained, for instance, by placing a pickup coil near the flyback transformer located in the picture scanning circuits 27 and forming a part of the conventional television receiver. The frequency appearing in the flyback transformer is the horizontal scanning frequency of 15,750 c.p.s. and this frequency is accurately locked to the horizontal scanning frequency of the television transmitter as is well known in the art.

The output from the sideband detector 41 comprises the audio signals within the range of 100–7,500 c.p.s. and this audio signal is fed to the deemphasis network 43 and thence to an audio amplifier 44 which amplifies the $A-B$ signal.

The audio amplifier 32 and the audio amplifier 44 each have two separate outputs which carry identical signals. One output from each of the amplifiers is delivered to a summation circuit 45 and the other output from each amplifier is delivered to a subtraction circuit 46. In the summation circuit 45, the input comprises $$A+B+A-B$$

and thus the B components cancel out leaving only the A components at the output of the summation circuit 45, and these A components are then delivered to a transducer 47 which reproduces them substantially as supplied to the input 1 of the television transmitter. The amplifiers deliver their outputs also to the subtraction circuit 46 which delivers a signal comprising $$A+B-(A-B)$$

and thus the A components cancel out leaving only the B components in the output of the subtraction circuit 46, and these B components are delivered to an audio transducer 48 which reproduces them substantially as delivered to the terminal 2 of the television transmitter T.

When employing the second harmonic of the standard horizontal scanning frequency, namely, when using 31,500 c.p.s. as the subcarrier, the subcarrier suppression and the upper side band suppression should be at least 40 decibels. In the main channel carrying the summation signal $A+B$, conventional monaural modulation techniques are employed but with a sharp rolloff above about 18,000 c.p.s. Standard 75 microsecond preemphasis is employed. In the second channel carrying the difference signal $A-B$, a sharp rolloff above about 7,500 c.p.s. is employed in the band-pass filter 8 and also a sharp rolloff below 100 c.p.s. Standard 75 microsecond preemphasis is also employed in this channel. Rolloff above 7,500 c.p.s is employed to restrict the total bandwidth, whereas rolloff below 100 c.p.s. is employed to prevent high energy audio below 100 c.p.s. from taking up too much modulation space. The human ear does not respond subjectively to direction of a sound source emanating sounds below about 100 cycles per second, whereas the ear is much more sensitive to direction at the higher frequencies up to about 7,000 or 8,000 c.p.s. Therefore, it is satisfactory to eliminate frequencies below 100 c.p.s.

It is also desirable when employing this system that the maximum frequency swing of the F.M. sound carrier be increased from ±25 kc. to ±32 kc. This is still within the range of present-day receivers.

Although this invention has been described with respect to a particular embodiment and numerical example as set forth in the drawings and specification, it is not limited specifically to the particula number selected. For instance, a similar system may be employed wherein the horizontal scanning frequency of 15,750 c.p.s. is employed instead of a harmonic thereof and in this event the upper sideband would be used to carry the information in the second, or B channel. This system has the advantage that a television network can transmit the modulated $A-B$ signal over present equipment without extending the bandwidth of the audio channel. Many transmissions could thus transmit stereo without any modification in the audio modulator whatever. Also, the present-day frequency-swing would not have to be increased. However, this system has the disadvantage that the sound transmitted would be of lower fidelity since it would reduce the frequency response in the first channel for the $A+B$ signal to about 12,000 c.p.s. from the 15,000 standard presently adhered to. However, if, as in this example, the horizontal scanning frequency of 15,750 c.p.s. is employed, the $A+B$ signal would then occupy 0–12,000 c.p.s. whereas the difference would begin at about 15,750 c.p.s. and extend to about 23,000 c.p.s.

I do not limit my invention to the exact form shown in the drawings for obviously changes may be made therein within the scope of the following claims.

I claim:

1. In combination with television transmission equipment having a predetermined horizontal scanning frequency and having means to modulate a sound carrier to a predetermined total bandwidth, a two-channel sound transmission system for applying to said sound carrier first and second audio messages, comprising means to add the audio messages to obtain a summation signal; first filter means to restrict the bandwidth of the summation signal to a first portion of said total bandwidth; means to subtract the audio messages to obtain a difference signal; second filter means to restrict said difference signal to a bandwidth not exceeding the remaining portion of said total bandwidth; subcarrier selecting means connected to said transmission equipment to receive said scanning frequency and to deliver a subcarrier harmonically related thereto and lying within said total bandwidth but outside of said first portion thereof; modulation means for modulating said subcarrier with the restricted difference signal; means for selecting a single sideband from the output of said modulation means said sideband lying within said remaining portion of said total bandwidth; and combining means for combining said sideband with said summation signal and connecting the combined signals to said means to modulate the sound carrier.

2. In combination with television receiving equipment having a sound carrier demodulator connected with an audio amplifying channel and having picture scanning circuits having a predetermined horizontal scanning frequency, a sound receiving system for recovering two different messages modulated on different portions of the sound carrier's modulation bandwidth, respectively as an audio signal comprising the summation of said two messages and as a sideband created by modulating a signal comprising the difference between said messages on a subcarrier which is precisely related harmonically to said horizontal scanning frequency, said sound system comprising in a second channel a sideband detector; band-pass filter means connecting said detector to said demodulator and passing only said sideband; subcarrier selecting means connected to said receiving equipment to receive said scanning frequency and to deliver to said sideband detector a subcarrier precisely related to said above-mentioned subcarrier whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

3. In a television system including a transmitter including a horizontal scanning frequency and including a sound carrier and a modulator for modulation thereof to a predetermined total bandwidth, and said system including a receiver having sweep means synchronized to said scanning frequency and having a sound carrier demodulator, a sound system for communicating two different audio messages on said sound carrier, comprising in the transmitter means to add the audio messages to obtain a summation signal; first filter means to restrict the bandwidth of the summation signal to a first portion of said total bandwidth; means to subtract the audio messages to obtain a difference signal; second filter means to restrict said difference signal to a bandwidth not exceeding the remaining portion of said total bandwidth; first subcarrier selecting means connected to said transmitter to receive said scanning frequency and to deliver a first subcarrier harmonically related thereto and lying within said total bandwidth but outside said first portion thereof; modulation means for modulating said subcarrier with the restricted difference signal; means for selecting a single sideband from the output of said modulation means, said sideband lying within said remaining portion of said total bandwidth; and combining means for combining said sideband with said summation signal and connecting the combined signals to said modulator to modulate the sound carrier; and said sound system including in the receiver a first amplifier channel connected to the demodulator and amplifying the demodulated summation signal; and a second channel including a sideband detector; band-pass filter means connecting said detector to said demodulator and passing only said sideband; second subcarrier selecting means connected to said sweep means to receive said scanning frequency and to deliver to said sideband detector a second subcarrier precisely related to said first subcarrier whereby the sideband may be demodulated to recover said difference signal; summation means connected with both channels for adding the summation signal and the difference signal to recover one message; and subtraction means connected with both channels to subtract the summation signal and the difference signal to recover the other message.

4. An attachment for connection to a television receiver having a sound carrier demodulator connected with an audio amplifying channel and having picture scanning circuits having a predetermined horizontal scanning frequency, said attachment converting the receiver to recover two different messages modulated on a received sound carrier, respectively as an audio signal comprising the summation of said two messages and as a sideband created by modulating a signal comprising the difference between said messages on a subcarrier which is precisely related harmonically to said horizontal scanning frequency, said attachment comprising in a second channel a sideband detector; band-pass filter means connecting said detector to said demodulator and passing only said sideband; subcarrier selecting means connected to said scanning circuits to receive said scanning frequency and to deliver to said sideband detector a subcarrier precisely related to said above-mentioned subcarrier whereby the sideband may be demodulated to recover said difference signal, the summation signal appearing in the audio channel of the receiver; summation means connected with both channels for adding the summation signal and the difference signal to recover one message, and subtraction means connected with both channels to subtract the summation signal and the difference signal to recover the other message.

5. In combination with television transmission equipment having a predetermined horizontal scanning frequency and having means to modulate a sound carrier; a two-channel sound transmission system for applying to said sound carrier first and second audio messages, comprising means to add the audio messages to obtain a summation signal; means to subtract the audio messages to obtain a difference signal; subcarrier selecting means connected to said transmission equipment to receive said scanning frequency and to deliver a subcarrier harmonically related thereto and lying outside the bandwidth of said summation signal; modulation means for modulating said subcarrier with the difference signal; means for selecting a single sideband from the output of said modulation means said sideband also lying outside of said bandwidth; and combining means for combining said sideband with said summation signal and connecting the combined signals to said means to modulate the sound carrier.

6. In combination with television receiving equipment having a sound carrier demodulator connected with an audio amplifying channel and having picture scanning circuits having a predetermined horizontal scanning frequency, a sound receiving system for recovering two different messages modulated on different portions of the sound carrier's modulation bandwidth, respectively as an audio signal comprising the summation of said two messages and as a sideband created by modulating a signal comprising the difference between said messages on a subcarrier which is precisely related harmonically to said horizontal scanning frequency, said sound system comprising in a second channel a sideband detector connected to said demodulator; subcarrier selecting means connected to said receiving equipment to receive said scanning frequency and to deliver to said sideband detector a subcarrier precisely related to said above-mentioned subcarrier whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

7. In a television system including a transmitter including a horizontal scanning frequency and including a sound carrier and a modulator for modulation thereof and said system including a receiver having sweep means synchronized to said scanning frequency and having a sound carrier demodulator, a sound system for communicating two different audio messages on said sound carrier, comprising in the transmitter means to add the audio messages to obtain a summation signal; means to subtract the audio messages to obtain a difference signal; first subcarrier selecting means connected to said transmitter to receive said scanning frequency and to deliver a first subcarrier harmonically related thereto and lying outside the bandwidth of said summation signal; modulation means for modulating said subcarrier with the difference signal; means for selecting a single sideband from the output of said modulation means, said sideband also lying outside said bandwidth; and combining means for combining said sideband with said summation signal and connecting the combined signals to said modulator to modulate the sound carrier; and said sound system including in the receiver a first amplifier channel connected to the demodulator and amplifying the demodulated summation signal; and a second channel including a sideband detector connected to said demodulator; second subcarrier selecting means connected to said sweep means to receive said scanning frequency and to deliver to said sideband detector a second subcarrier precisely related to said first subcarrier whereby the sideband may be demodulated to recover said difference signal; summation means connected with both channels for adding the summation signal and the difference signal to recover one message; and subtraction means connected with both channels to subtract the summation signal and the difference signal to recover the other message.

8. An attachment for connection to a television receiver having a sound carrier demodulator connected with an audio amplifying channel and having picture scanning circuits having a predetermined horizontal scanning frequency, said attachment converting the receiver to recover two different messages modulated on a received sound carrier, respectively as an audio signal comprising the summation of said two messages and as a sideband created by modulating a signal comprising the difference between said messages on a subcarrier which is precisely related harmonically to said horizontal scanning frequency, said attachment comprising in a second channel a sideband detector connected to said demodulator; subcarrier selecting means connected to said scanning circuits to receive said scanning frequency and to deliver to said sideband detector a subcarrier precisely related to said above-mentioned subcarrier whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

9. In combination with television transmission equipment having a horizontal scanning frequency of substantially 15,750 cycles per second and having means to modulate a sound carrier to a total bandwidth of at least 31,500 cycles per second, a two-channel sound transmission system for applying to said sound carrier first and second audio messages, comprising means to add the audio messages to obtain a summation signal; first filter means to restrict the bandwidth of the summation signal within the range of approximately 0–20,000 cycles per second; means to subtract the audio messages to obtain a difference signal; second filter means to restrict said difference signal to a bandwidth not exceeding approximately 10,000 cycles per second; a frequency doubler connected to said transmission equipment to receive said scanning frequency and to deliver as a subcarrier the second harmonic thereof; modulation means for modulating said subcarrier with said restricted difference signal; means for selecting the lower sideband from the output of said modulation means; and combining means for combining said sideband with said summation signal and connecting the combined signals to said means to modulate the sound carrier.

10. In combination with television receiving equipment having a sound carrier demodulator connected with an audio amplifying channel and having picture scanning circuits having a horizontal scanning frequency of substantially 15,750 cycles per second, a sound receiving system for recovering two different messages modulated on different portions of the sound carrier's modulation bandwidth, respectively as an audio signal comprising the summation of said two messages and as the lower sideband created by modulating a signal comprising the difference between said messages on a subcarrier which is equal to the second harmonic of said horizontal scanning frequency, said sound system comprising in a second channel a sideband detector connected to said demodulator; a frequency doubler connected to said receiving equipment to receive said scanning frequency and to deliver to said sideband detector a subcarrier precisely equal to twice said scanning frequency and locked thereto, whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

11. In a television system including a transmitter including a horizontal scanning frequency of substantially 15,750 cycles per second and including a sound carrier and a modulator for modulation thereof to a total bandwidth of at least 31,500 cycles per second, and said system including a receiver having sweep means synchronized to said scanning frequency and having a sound carrier demodulator, a sound system for communicating two different audio messages on said sound carrier, comprising in the transmitter means to add the audio messages to obtain a summation signal; first filter means to restrict the bandwidth of the summation signal within the range of 0–20,000 cycles per second; means to subtract the audio messages to obtain a difference signal; second filter means to restrict said difference signal to a bandwidth not exceeding approximately 10,000 cycles per second; a first frequency doubler connected to said transmitter to receive said scanning frequency and to deliver as a first subcarrier the second harmonic thereof; modulation means for modulating said subcarrier with the restricted difference signal; means for selecting the lower sideband from the output of said modulation means; and combining means for combining said side band with said summation signal and connecting the combined signals to said modulator to modulate the sound carrier; and said sound system including in the receiver a first amplifier channel connected to the demodulator and amplifying the demodulated summation signal, and a second channel including a sideband detector connected to said demodulator; a second frequency doubler connected to said sweep means to receive said scanning frequency and to deliver to said sideband detector the second harmonic thereof whereby the sideband may be demodulated to recover said difference signal; summation means connected with both channels for adding the summation signal and the difference signal to recover one message; and subtraction means connected with both channels to subtract the summation signal and the difference signal to recover the other message.

12. An attachment for connection to a television receiver having a sound carrier demodulator connected with an audio amplifying channel and having picture scanning circuits having a horizontal scanning frequency of substantially 15,750 cycles per second, said attachment converting the receiver to recover two different messages modulated on a received sound carrier, respectively as an audio signal comprising the summation of said two messages and as the lower sideband created by modulating a signal comprising the difference between said messages on a subcarrier which is equal to the second harmonic of said horizontal scanning frequency, said attachment comprising in a second channel a sideband detector connected to said demodulator; a frequency doubler connected to said scanning circuits to receive said scanning frequency and to deliver to said sideband detector a subcarrier precisely equal to twice said scanning frequency and locked thereto, whereby the sideband may be demodulated to recover said difference signal, said summation signal appearing in the said audio amplifying channel; summation means connected with both channels for adding the summation signal and the difference signal to recover one message; and subtraction means connected with both channels to subtract the summation signal and the difference signal to recover the other message.

13. In combination with television transmission equipment having a horizontal scanning frequency of substantially 15,750 cycles per second and having means to modulate a sound carrier to a total bandwidth of at least 23,000 cycles per second, a two-channel sound transmission system for applying to said sound carrier first and second audio messages, comprising means to add the audio messages to obtain a summation signal; first filter means to restrict the bandwidth of the summation signal within the range of approximately 0–15,000 cycles per second; means to subtract the audio messages to obtain a difference signal; second filter means to restrict said difference signal to a bandwidth not exceeding approximately 7,500 cycles per second; subcarrier selecting means connected to said transmission equipment to receive said scanning frequency and to deliver a subcarrier equal thereto; modulation means for modulating said subcarrier with said restricted difference signal; means for selecting the upper sideband from the output of said modulation means; and combining means for combining said sideband with said summation signal and connecting the combined signals to said means to modulate the sound carrier.

14. In combination with television receiving equipment having a sound carrier demodulator connected with an audio amplifying channel and having picture scanning circuits having a predetermined horizontal scanning frequency, a sound receiving system for recovering two different messages modulated on different portions of the sound carrier's modulation bandwidth, respectively as an audio signal comprising the summation of said two messages and as the upper sideband created by modulating a signal comprising the difference between said messages on a subcarrier which is precisely equal to said horizontal scanning frequency, said sound system comprising in a second channel a sideband detector connected to said demodulator; subcarrier means connected to said receiving equipment to receive said scanning frequency and to deliver to said sideband detector a subcarrier precisely equal thereto and locked therewith, whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

15. In a television system including a transmitter including a horizontal scanning frequency of substantially 15,750 cycles per second and including a sound carrier and a modulator for modulation thereof to a total bandwidth of at least 23,000 cycles per second, and said system including a receiver having sweep means synchronized to said scanning frequency and having a sound carrier demodulator, a sound system for communicating two different audio messages on said sound carrier, comprising in the transmitter means to add the audio messages to obtain a summation signal; first filter means to restrict the bandwidth of the summation signal within the range of approximately 0–15,000 cycles per second; means to subtract the audio messages to obtain a difference signal; second filter means to restrict said difference signal to a bandwidth not exceeding approximately 7,500 cycles per second; first subcarrier selecting means connected to said transmitter to receive said scanning frequency and to deliver a first subcarrier equal thereto; modulation means for modulating said subcarrier with the restricted difference signal; means for selecting the upper sideband from the output of said modulation means; and combining means for combining said sideband with said summation signal and connecting the combined signals to said modulator to modulate the sound carrier; and said sound system including in the receiver a first amplifier channel connected to the demodulator and amplifying the demodulated summation signal, and a second channel including a sideband detector connected to said demodulator, second subcarrier selecting means connected to said sweep means to receive said scanning frequency and to deliver to said sideband detector a second subcarrier precisely equal to said first subcarrier whereby the sideband may be demodulated to recover said difference signal to recover one message; and subtraction means connected with both channels to subtract the summation signal and the difference signal to recover the other message.

16. An attachment for connection to a television receiver having a sound carrier demodulator connected with an audio amplifying channel and having picture scanning circuits having a predetermined horizontal scanning frequency, said attachment converting the receiver to recover two different messages modulated on a received sound carrier, respectively as an audio signal comprising the summation of said two messages and the upper sideband created by modulating a signal comprising the difference between said messages on a subcarrier which is precisely equal to said horizontal scanning frequency, said attachment comprising in a second channel a sideband detector connected to said demodulator; subcarrier means connected to said scanning circuits to receive said scanning frequency and to deliver to said sideband detector a subcarrier precisely equal thereto and locked therewith, whereby the sideband may be demodulated to recover said difference signal, the summation signal appearing in said audio amplifying channel; summation means connected with both channels for adding the summation signal and the difference signal to recover one message; and subtraction means connected with both channels to subtract the summation signal and the difference signal to recover the other message.

References Cited in the file of this patent

UNITED STATES PATENTS

| | | |
|---|---|---|
| 2,089,639 | Bedford | Aug. 10, 1937 |
| 2,810,782 | Hester | Oct. 22, 1957 |
| 2,851,532 | Crosby | Sept. 9, 1958 |

OTHER REFERENCES

"Recent Developments in Stereo Broadcasting," Electronics, April 3, 1959.